(12) United States Patent
Matsuo

(10) Patent No.: US 10,713,700 B2
(45) Date of Patent: Jul. 14, 2020

(54) REPLACEMENT FOOTWEAR, PROCESS FOR ADDITION OF FOOTWEAR TO A USER'S FOOTWEAR COLLECTION, FOOTWEAR VENDING MACHINE, FOOTWEAR DISTRIBUTION PROCESS AND FOOTWEAR REPLACEMENT PROCESS

(71) Applicant: Grendene S.A., Sobral (BR)

(72) Inventor: Edson Matsuo, Porto Alegre (BR)

(73) Assignee: Grendene S.A., Sobral (BR)

( * ) Notice: Subject to any disclaimer, the term of this patent is extended or adjusted under 35 U.S.C. 154(b) by 425 days.

(21) Appl. No.: 15/522,335

(22) PCT Filed: May 11, 2015

(86) PCT No.: PCT/BR2015/050057
§ 371 (c)(1),
(2) Date: Apr. 27, 2017

(87) PCT Pub. No.: WO2016/065448
PCT Pub. Date: May 6, 2016

(65) Prior Publication Data
US 2017/0337608 A1    Nov. 23, 2017

(30) Foreign Application Priority Data

Oct. 31, 2014  (BR) .......................... 1020140272852

(51) Int. Cl.
| | | |
|---|---|---|
| G06Q 30/00 | (2012.01) | |
| G06Q 30/06 | (2012.01) | |
| A43B 13/14 | (2006.01) | |
| G07F 11/00 | (2006.01) | |
| A43B 3/00 | (2006.01) | |
| G06Q 20/18 | (2012.01) | |
| G07F 11/62 | (2006.01) | |
| G07F 11/70 | (2006.01) | |

(52) U.S. Cl.
CPC ....... *G06Q 30/0621* (2013.01); *A43B 3/0036* (2013.01); *A43B 13/14* (2013.01); *G06Q 20/18* (2013.01); *G07F 11/00* (2013.01); *G07F 11/62* (2013.01); *G07F 11/70* (2013.01)

(58) Field of Classification Search
CPC .................................................. G06Q 30/0621
See application file for complete search history.

(56) References Cited

U.S. PATENT DOCUMENTS

| | | |
|---|---|---|
| 3,720,350 A | 3/1973 | Patrick |
| 7,171,768 B2 | 2/2007 | Klein |
| 7,317,965 B2 | 1/2008 | Koyama |
| 7,845,095 B2 | 12/2010 | Langvin et al. |
| 8,386,074 B2 | 2/2013 | Smith |

FOREIGN PATENT DOCUMENTS

WO    2008/109660 A2    9/2008

OTHER PUBLICATIONS

Uma cooks up customizable shoe kiosk. (2006). Retailing Today, 45(21), 15. Retrieved from https://search.proquest.com/docview/228446068?accountid=14753.*
WIPO, International Search Report (on parent application), dated Jul. 22, 2015.

* cited by examiner

*Primary Examiner* — Kathleen Palavecino
(74) *Attorney, Agent, or Firm* — Laurence P. Colton; Smith Tempel Blaha LLC

(57) ABSTRACT

The present invention refers to the field of shoemaking industry and discloses a replacement shoe, a process for adding shoes to a user shoes collection, a shoes vending machine, a shoes distribution process and a shoes replacement process, more specifically, an automation and optimization of the current logistic process between the industry and/or shoes distributors and resellers until product delivery to the final customer. The present invention also allows the supply of one shoe only since the shoe distributed together with objects of the present invention comprises a geometry that adapts both to the left foot and the right foot. Thus, throughout the manufacturing, sales and products distribution logistic chain, the present invention advantageously discloses the offer of a larger variety of product ranges to the final customer, also allowing stock replenishment using small vehicles, for example, motorcycles.

5 Claims, No Drawings

REPLACEMENT FOOTWEAR, PROCESS FOR ADDITION OF FOOTWEAR TO A USER'S FOOTWEAR COLLECTION, FOOTWEAR VENDING MACHINE, FOOTWEAR DISTRIBUTION PROCESS AND FOOTWEAR REPLACEMENT PROCESS

FIELD OF THE INVENTION

The present invention describes a replacement shoe, a process for adding shoes to a user shoes collection, a shoes vending machine, a shoes distribution process and a shoes replacement process, more specifically, shoes vending machine replacement. The present invention in within the field of the shoemaking industry.

BACKGROUND OF THE INVENTION

In the field of shoemaking, searching for technical solutions is a topic of high interest, not only for users' new shoes and accessories, but also for developing new manufacture, distribution and product sales strategies.

Unequal wear between the right and left shoes that compose a pair of shoes is a common problem due to several factors that may be mentioned during its use. However, market demand for a pair of shoes is much higher than the demand for one of the sides of the pair (right or left), so that when a customer has only one of the sides of the pair worn out, he/she is obliged to purchase a new full pair.

Currently, shoes are commonly sold in pairs, so that one interested in purchasing only one of the sides of the pair, that is, only the right or only the left, is obliged to purchase new full pair to replace the side of interest.

Additionally, a user that does not primarily need a pair of shoes, for example, a handicapped user who does not have one of the feet, is also obliged to purchase a pair of shoes instead of having the possibility to purchase only the shoe side of interest.

Additionally, in general, the sale of shoes is limited to physical and online stores; in the first case, it is necessary to pay for expenses such as public attendance location, qualified personnel to sell and manage the store, in addition to expenses related to the storage and marketing of the products for sale. Regarding online stores, they require expenses for maintenance, update, security and advertisement of the online store website, in addition to expenses related to the storage and marketing of the products for sale. High expenses make physical and online stores (not only shoe stores) to raise the product prices to the final customer, aiming to guarantee its profit margin. In some cases, this fact directly affects the sales considering a product demand, and, in general, it is inversely proportional to the product price.

As an alternative to reduce and control the expenses, stores tend to replenish their stocks in large lots; this strategy impacts the freight price, however, it is necessary to perform this operation using large vehicles, such as box trucks and/or truck-trailers.

Thus, efficient interface means are constantly sought that offer at the same time a larger variety of options to the customer and further facilitates the distribution and logistics among everyone involved in the products manufacturing, sale and delivery chain, for example, manufacturing sites and distribution centers, distribution centers and stores, stores and customer, distribution centers and customer, etc.

When searching prior art in scientific and patent literatures, the following documents regarding this theme were found:

WO 2008/109660 discloses a shoe article to be worn on the right foot and on the left foot. In one aspect of WO 2008/109660, the shoe article comprises an upper including an inner region configured to adjust to the right foot and to the left foot, and an insert also configured to adjust to the right foot and to the left foot, where the insert is made of a deformable material offering side and central support to the foot during use. However, WO 2008/109660 suggests the application of an insert in order to accommodate the user foot (which adjusts both to the right foot and the left foot) and further comprises an inner front portion disclosing a void region so that both the user right foot and left foot may fit inside the upper of the present invention. Said void region or recess existing in the prior art shoe causes discomfort and lack of firmness to the user since the user foot may move inside the upper. The existing clearance causes the lack of firmness when fixing the shoe to the user foot and may not only cause discomfort, but it is also inconvenient when wearing the shoe while walking or running. Thus, the present invention proposes a solution completely different from that of WO 2008/109660, since WO 2008/109660 does not seek to solve the problem regarding distribution logistics and the possibility of selling only one article of footwear for replacement purposes.

U.S. Pat. No. 8,386,074 refers to a products vending machine comprising: a housing for storing the product with a support structure; a plurality of supports fixed to the support structure for all products; a plurality of RFID sensors, being one for each type of product support; a payment means; a display for the product; and a computer control system. Said solution, however, comprises a complex structure requiring more than one type of display as communication interface with the customer, as well as more than one type of support, in addition to not allow the shoe sale, the machine of said document being limited to shoe accessories. Further, said document does not disclose a solution to control the stock of said shoes vending machine.

U.S. Pat. No. 7,317,965 refers to a vending machine and shoe manufacturing, more specifically sandals. The machine disclosed in said document comprises: a compartment for sandal soles having a plurality of soles; a compartment for uppers having a plurality of uppers; a size selection means, so that the user select the sole size and the upper size; a payment means; a mechanism for assembling the upper on the selected sole; and a means for ejecting the assembled shoe for the user. Said solution, however, does not disclose a solution for shoes not comprising assemblable parts, not even shoes consisting in a single layer. Additionally, said document does not disclose a solution to control the stock of said shoes vending machine.

Thus, from what is understood in the searched literature, no documents anticipating or suggesting the teachings of the present invention were found, so that the solution proposed herein is provided with novelty and inventive activity when compared to the prior art.

Thus, it is evident the need of shoes and related systems that offer more versatile options to the customer and, at the same time, simplify the distribution logistics chain of the shoemaking industry.

SUMMARY OF THE INVENTION

So, the present invention is intended to solve the prior art problems by means of a replacement shoe, a process for adding shoes to a user shoes collection, shoes vending machines, a shoes distribution process, and by means of a shoes replacement process, so as to simplify the shoemaking industry logistic chain.

In a first object, the present invention discloses a replacement shoe I of a set of shoe II/shoe III, the replacement shoe I having a geometry that adapts both to the user's left foot and right foot, wherein the replacement shoe I is selected by the user according to at least one physical feature of said replacement shoe I, with said physical feature being at least one from the group defined by: size; shape; decorativeness; functionality; and/or material.

In a second object, the present invention discloses a process for adding shoes to a user shoes collection, the user shoes collection consisting in at least one shoe, wherein the processes for adding shoes comprise the steps of:
  allowing the selection of at least one shoe for incorporating the user shoes collection, the selection options being classified according to the physical features of the shoes available for selection;
  combining at least one selectable physical feature of at least one shoe selected with at least one physical feature of at least one shoe of the user collection;
  wherein the physical features composing the shoe is defined by the user upon selection of the shoe.

In a third object, the present invention discloses a shoes vending machine comprising:
  partitioned storage means, comprising at least one shoe storage partition;
  selection interface;
  payment means;
  delivery means; and
  processing modulus;
  wherein:
  each storage partition having at least one set of shoes with at least one feature in common, the shoe having a geometry that adapts both to the user's left foot and his/her right foot;
  the selection interface provides the available shoe options in the partitioned storage means, according to any of the shoe physical features;
  the physical feature is from the group defined by: size; shape; decorativeness; functionality; and/or material.

In a fourth object, the present invention discloses a shoes distribution process comprising the steps of:
  storing the shoes divided into assemblies selected according to their physical features;
  identifying the shoes according to the required physical features;
  shoes separation;
  shoes dispatch;
  wherein the shoe of said process is according to claim 1 or 2, wherein the physical features are selected from the group defined by: size; shape; decorativeness; functionality, and/or material.

In a fifth object, the present invention discloses a shoes replacement process comprising the steps of:
  shoe ordering;
  shoe receiving;
  comparing the received shoe with that ordered; and
  replacing out of stock shoes;
  wherein the shoe of said process is according to claim 1 or 2.

Further, the invention concept common to all claimed protection contexts is the fact to provide a more versatile shoe and more customization options to the customer. Additionally, the embodiments of the present invention significantly simplify the manufacturing, distribution, sale and products delivery logistic chain.

These and other objects of the invention will be promptly recognized by those skilled in the art and by the companies interested in this segment, and will be sufficiently described in detail for its practice in the following description.

DETAILED DESCRIPTION OF THE INVENTION

The present invention is intended to solve the prior art problems by means of a replacement shoe, specifically an article of footwear, a process for adding shoes to a user shoes collection, shoes vending machines, a shoes distribution process, and by means of a shoes replacement process, so as to simplify the shoemaking industry logistic chain, as well as to help the final customer when purchasing shoes of his/her interest.

In a first object, the present invention discloses a replacement shoe I of a set of shoe II/shoe III, the replacement shoe I having a geometry that adapts both to the user's left foot and right foot, wherein the replacement shoe I is selected by the user according to at least one physical feature of said replacement shoe I, with said physical feature being at least one from the group defined by: size; shape; decorativeness; functionality; and/or material.

In one embodiment of the replacement shoe of the present invention, shoe II and shoe III have the same configuration, wherein shoe I discloses physical features (size, shape, decorativeness, functionality, and/or material) which differ from those of shoe II and/or shoe III.

In one embodiment of the replacement shoe of the present invention, said aesthetical feature is a decoration feature, the shape feature is a geometric feature, the size feature is a feature related to the sizes of the shoes and the material feature is a feature of the material forming the shoe.

In one embodiment, the shoe of the present invention is a replacement shoe, wherein it is intended to replace at least one of the sides of the pair of shoes, or in other words an article of footwear, that has been lost or worn out due to use. The replacement shoe of the present invention has a geometry that adapts both to the left foot and the right foot, thus, regardless of the pair side that has been lost or worn out (what may happen for several reasons), the customer may purchase a new shoe as needed, and not a new full pair of shoes.

In one embodiment, the replacement shoe of the present invention is the shoe described in the patent application BR 10 2014 018869.

In a second object, the present invention discloses a process for adding shoes to a user shoes collection, the user shoes collection consisting in at least one shoe, wherein the processes for adding shoes comprise the steps of:
  allowing the selection of at least one shoe, or article of footwear, for incorporating the user shoes collection, the selection options being classified according to the physical features of the shoes available for selection;
  combining at least one selectable physical feature of at least one shoe selected with at least one physical feature of at least one shoe of the user collection;
  wherein the physical features composing the shoe is defined by the user upon selection of the shoe.

The selectable physical feature composing the shoe is from the group defined by: size; shape; feature decorativeness; functionality feature; and/or material. Wherein the functionality feature is from the group defined by: scent; sound; visual; performance; and/or theme.

Within the context of the present invention, the term "container" can be understood as a storage or transportation means hereof, for example, a box, a pack or a paper, polymer, fabric bag or combinations of the same. Additionally, the container can be rigid or flexible.

In a third object, the present invention discloses a shoes vending machine comprising:
  partitioned storage means, comprising at least one shoe storage partition;
  selection interface;
  payment means;
  delivery means; and
  processing modulus;
  wherein:
  each storage partition having at least one set of shoes set with at least one feature in common, the shoe having a geometry that adapts both to the user left foot and his/her right foot;
  the selection interface provides the available shoe options in the partitioned storage means, according to any of the shoe physical features;
  the physical feature is from the group defined by: size; shape; decorativeness; functionality; and/or material.

The shoes vending machine of the present invention discloses, in a preferred embodiment, delivery means that supply the shoes individually, thus allowing the user to only purchase a single article of footwear, as needed, and/or to combine an article of footwear with a decorative arrangement with another article of footwear with decorative arrangement different from the previous one. Further, the shoe sold by the shoes vending machine has a geometry that is able to adapt to the anatomy of both the user right foot and the left foot. Said geometric feature of the shoe, together with the customization options provided, provides the shoes vending machine of the present invention with a range of shoe options to the customer greater than the conventional prior art for sale. Additionally, the shoes vending machine comprises packaging means for the shoe sold, which is packaged individually.

The processing modulus of said shoes vending machine comprises at least a means of communication with the internet, which allows the shoes vending machine to request one unavailable shoe or small quantities of shoes in the partitioned storage means. Further, the processing modulus actuates the selection interface, the payment means and the delivery means. Additionally, the processing modulus acts in the partitioned storage means. Also, the processing modulus found in the shoes vending machines comprises at least one connection means with the internet, said means being used for communication with financial operators (regarding the payment means), and/or with the shoes distributor (regarding the request of shoes for restocking).

The selection interface of said shoes vending machine allows the user to select the desired shoe, wherein the machine shows the options available in its partitioned storage means. So, the selection interface is provided with means to identify the shoes available in its storage means, for example, RFID and OCR-type sensors that will identify the shoe placed in the storage means during restocking.

Additionally, the selection interface provides a shoe models catalog for pre-sale, in which said shoes are requested to the factory upon submission of a payment receipt of said order by the customer. In this way, the customer has a wider range of available shoes at his/her service.

Additionally, the selection interface provides an interactive menu for the customer, so that he/she may choose a shoe model he/she wishes and, from that point on, change the shoe features aiming to customize the shoe; later, it is possible to pre-order the customized shoe from the shoes vending machine.

Aiming to provide increased convenience to the user who decided to request a shoe unavailable in the partitioned storage means when purchasing it, both a specific model available at the shoe manufacturer's catalog or a user customized shoe, the selection interface comprises a means of communication with the user, thus allowing to inform him/her that the requested product is ready for pickup.

In a fourth object, the present invention discloses a shoes distribution process comprising the steps of:
  storing the shoes divided into assemblies selected according to the type, size and functional elements;
  identifying the shoes according to the type, size and required functional elements;
  shoes separation;
  shoes dispatch;
  wherein the shoe of said process has a geometry that adapts both to the user left foot, and his/her right foot.

With regards to the shoes storage and/or shoes identification step, said steps take place in a optimized fashion, with the shoes being stored and identified only according to the type, size and functional elements, without having to identify the shoe side (right or left), since the shoe has a geometry that adapts both to the left foot and the right foot. The shoe geometry also requires smaller storage room and/or less packaging material, thus optimizing room usage when compared to the prior art logistic processes.

Additionally, the shoes distribution process comprises a packaging step, wherein each shoe is packaged alone.

Regarding dispatch step, said step take place after the shoe packaging, being optimized by the grouping of shoes having the same technical feature, thus allowing the use of a smaller area of the transportation vehicle cargo compartment, so that a small transportation vehicle can be used, such as a urban cargo van truck, a pickup truck, a van, a car, or a motorcycle.

Regarding the order identification step, said step may take place by preparing an order by a reseller or by a shoes vending machine, as defined above. In this case, the shoes vending machine is provided with a means for identifying low-stock shoes in its shoe storage means, wherein said means automatically issues a restock order from a predetermined minimum shoe stock limit in its storage means.

In a fifth object, the present invention discloses a shoes replacement process comprising the steps of:
  shoe ordering;
  shoe receiving;
  comparing the received shoe with that ordered; and
  replacing out of stock shoes;
  wherein the shoe of said process has a geometry that adapts both to the user left foot, and his/her right foot.

Regarding the step for determining the type and quantity of shoes in stock to prepare or not a replacement order to the distributor, in one embodiment said shoe type and quantity determination step is performed by the shoes vending machine. Additionally, in one embodiment, the ordering step is performed by the shoes vending machine, and does not require the hiring of a person to monitor it.

With such embodiments, the present invention allows the supply of only one shoe, since the shoe distributed as per the objects of the present invention has a geometry that adapts both to the left foot and the right foot. Thus, the present invention provides increased versatility and endless customization options according to the customer interest.

In one embodiment, the present invention is optimized for selling individual shoes after the standard selling of a pair of shoes. In order to assist customers interested in having exclusive shoe options and/or who need to purchase only one shoe (e.g. when one shoe of the pair is lost, shoes unequally worn out, substantial difference in the customer feet sizes, when purchasing shoes with different sizes provides increased comfort to the final customer etc).

Those skilled in the art will appreciate the teachings provided herein and will be able to practice the invention using the embodiments showed above and in other variants within the scope of the appended claims.

The invention claimed is:

1. A shoe vending machine for selling an individual shoe to a user, comprising:
   a) a partitioned storage means, comprising at least one shoe storage partition;
   b) a selection interface;
   c) a payment means;
   d) a delivery means for individually supplying a shoe stored in the partoned storage means to the user; and
   e) a processing modulus comprising a means for communication with the internet, the processing modulus actuating the partitioned storage means, the selection interface, the payment means, and the delivery means;
   wherein:
   each of the at least one shoe storage partition having at least one shoe having at least one feature in common with at least one feature of at least one shoe of a user shoes collection;
   the shoes stored in the partitioned storage means each having a geometry that adapts to both of the user's left foot and right foot;
   the selection interface provides available shoe options for the shoes stored in the partitioned storage means, according to any physical feature of the shoe, wherein the selection interface comprises at least one of a shoe models catalog for pre-sale of a shoe ordered by the user, an interactive menu for customization of a shoe by the user, a means for communication with the user to inform the user that a requested shoe is ready for pickup, and a means to identify the shoes available in the partitioned storage means, wherein the means to identify the shoes available automatically issues a restock order from a predetermined minimum shoe stock limit in the partitioned storage means; and
   the physical feature is selected from the group consisting of: size; shape; decorativeness; functionality; and material.

2. The shoe vending machine according to claim 1, wherein the individual shoe is a replacement shoe I of a set of shoe II/shoe III, the replacement shoe I comprising a geometry compatible both with a user's left foot and right foot, wherein the replacement shoe I is selected by the user according to at least one physical feature of the replacement shoe I, with the physical feature being selected from the group consisting of: size; shape; decorativeness; functionality; and material.

3. The shoe vending machine according to claim 2, wherein the shoe II and the shoe III have the same configuration as each other, and wherein the shoe I discloses different physical features of those of the shoe II and/or the shoe III.

4. The shoe vending machine according to claim 1, further comprising a process for adding shoes to the user shoes collection, the process for adding shoes comprising the steps of:
   a) allowing the selection of at least one shoe for incorporation in the user shoes collection, the selection being based on options classified according to physical features of the shoes available for selection; and
   b) combining at least one selectable physical feature of the at least one shoe selected with at least one physical feature of at least one shoe of the user shoes collection;
   wherein the physical features composing the at least one shoe selected is defined by the user upon selection of the at least one shoe selected.

5. The shoe vending machine, according to claim 1, wherein individual delivery of the individual shoe is performed after the sale of a pair of shoes that the user already has in the user shoe collection.

* * * * *